(12) United States Patent
Honda et al.

(10) Patent No.: US 12,540,147 B2
(45) Date of Patent: Feb. 3, 2026

(54) METHOD FOR PURIFYING ORGANIC COMPOUND AND METHOD FOR PRODUCING ORGANIC COMPOUND

(71) Applicant: TOKUYAMA CORPORATION, Yamaguchi (JP)

(72) Inventors: Shota Honda, Yamaguchi (JP); Takashi Nishiyama, Hokkaido (JP); Takenori Isomura, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 550 days.

(21) Appl. No.: 17/998,497

(22) PCT Filed: May 12, 2021

(86) PCT No.: PCT/JP2021/018026
§ 371 (c)(1),
(2) Date: Nov. 11, 2022

(87) PCT Pub. No.: WO2021/230280
PCT Pub. Date: Nov. 18, 2021

(65) Prior Publication Data
US 2023/0234975 A1   Jul. 27, 2023

(30) Foreign Application Priority Data
May 15, 2020   (JP) ................................ 2020-086205

(51) Int. Cl.
*C07F 7/20*   (2006.01)
(52) U.S. Cl.
CPC ..................................... *C07F 7/20* (2013.01)
(58) Field of Classification Search
CPC .................................... C07F 7/20; C07B 63/02
See application file for complete search history.

(56) References Cited

U.S. PATENT DOCUMENTS

| | | | | |
|---|---|---|---|---|
| 5,175,380 | A | * | 12/1992 | Raab .......................... A61P 7/08 570/177 |
| 5,358,611 | A | * | 10/1994 | Bauer, Jr. .............. C07C 51/487 204/158.21 |
| 2005/0090502 | A1 | * | 4/2005 | Coppola ................... A61P 5/50 514/363 |

FOREIGN PATENT DOCUMENTS

| | | |
|---|---|---|
| CN | 110981681 A | 4/2020 |
| EP | 0714854 A1 | 6/1996 |
| JP | S58-150532 A | 9/1983 |
| JP | S62-246537 A | 10/1987 |
| JP | H07-048312 A | 2/1995 |
| JP | H07-206730 A | 8/1995 |
| JP | 08-099954 A | 4/1996 |
| JP | 2003-128630 A | 5/2003 |
| JP | 2005-279409 A | 10/2005 |
| JP | 2006-298884 A | 11/2006 |
| WO | WO-2022224951 A1 * | 10/2022 ............. A62D 3/176 |

OTHER PUBLICATIONS

P. Lu et al., 72 Journal of Organic Chemistry, 2564-2569 (2007) (Year: 2007).*
J. ter Vrugt et al., High pressure mercury vapour lamps, 127 IEE Proc, 173-180 (1980) (Year: 1980).*
C. Felix et al., The effect of distance from light source on light intensity from curing lights, 5 Journal of Adhesive Dentistry, 283-291 (2003) (Year: 2003).*
F. Churruca et al., 12 Organic Letters, 2096-2099 (2010) (Year: 2010).*
J. Kauffman et al., 48 Regulatory Toxicology and Pharmacology, 128-134 (2007) (Year: 2007).*
Sigma-Aldrich, Certificate of Analysis, Acetonitrile (2012) (Year: 2012).*
Pharmco, Product Specifications Sheet, Acetonitrile (HPLC LC/MS Grade) (2023) (Year: 2023).*
D. Malinovsky et al., Goldschmidt Conference Abstracts, A661 (2010) (Year: 2010).*
J. Rigby, "Photodeposition from tetra ethyl lead", 65 Transactions of the Faraday Society, 2421-2429 (1969) (Year: 1969).*
Written Opinion issued in corresponding International Application No. PCT/JP2021/018026 mailed Jul. 20, 2021 (4 pages).
International Search Report issued in corresponding International Application No. PCT/JP2021/018026 mailed Jul. 20, 2021, with translation (7 pages).
Office Action issued in counterpart Chinese Application No. 202180030628.4, dated Jun. 29, 2023, with English Translation (17 pages).
Blair, J. McDonald et al., "645. Liquid-Phase Photolysis. Part I. Variation of Isomer Ratios with Radical Source in the Phenylation of Isopropylbenzene. Photolytic Generation of Phenyl Radicals", Journal of the Chemical Society, Jan. 1, 1959, pp. 3174-3178, XP093083603, ISSN: 0368-1769 (5 pages).
Extended European Search Report issued in corresponding European Patent Application No. 21803398.3 mailed Oct. 5, 2023 (11 pages).

* cited by examiner

*Primary Examiner* — Alexander R Pagano
(74) *Attorney, Agent, or Firm* — Osha Bergman Watanabe & Burton LLP

(57) ABSTRACT

The present invention provides a method for purifying an organic compound, by which an organic compound having a reduced lead content is obtained from an organic compound that contains a lead component as an impurity. In this method for purifying an organic compound, the organic compound that contains a lead component is irradiated with ultraviolet light, and the lead component is subsequently removed from the organic compound. The present invention also provides a method for producing an organic compound, said method comprising purification of the organic compound by means of the above-described method for purifying an organic compound.

9 Claims, No Drawings

US 12,540,147 B2

METHOD FOR PURIFYING ORGANIC COMPOUND AND METHOD FOR PRODUCING ORGANIC COMPOUND

TECHNICAL FIELD

The present invention relates to a method for purifying an organic compound, by which an organic compound having a reduced lead content is obtained from an organic compound containing a lead component as an impurity, and a method for producing an organic compound.

BACKGROUND ART

Among organic compounds synthesized by organic synthesis, many of them are used as electronic materials and active pharmaceutical ingredients. In these applications, strict control of the impurity content thereof is demanded, and, for example, the metal impurity content in electronic materials and active pharmaceutical ingredients is demanded to be at a ppb level on a mass basis, and particularly that in organic compounds used to produce cutting-edge semiconductors is demanded to be at a sub-ppb level on a mass basis.

In the synthesis of an organic compound, a reaction using an organic metal compound has been widely used. However, in the above reaction using an organic metal compound, a trace amount of metal impurities is contained in metal used, in many cases, and these metal impurities are contained in the organic compound produced. Examples of metal impurities which are generally mixed include sodium, magnesium, potassium, calcium, iron, zinc, nickel, copper and the like. Therefore, after producing an organic compound, metal impurities contained are removed by various purification methods. As such method for purifying an organic compound, e.g. distillation and a separation operation are generally known. In addition, as a method for removing metal impurities, acid washing, washing using an ion exchange resin, washing using a chelate resin and washing using activated carbon have been used. An organic compound is purified by combining the above purification operations considering e.g. removal efficiency of metal impurities, an object to be removed.

In Grignard reaction which is frequently used for organic syntheses, for example, an organic magnesium halide compound (Grignard reagent) may be produced from an organic halide and metal magnesium for the reaction. At this time, a trace amount of metal impurities such as lead are contained in metal magnesium. Therefore, as a method for removing metal impurities in an organic compound produced by Grignard reaction, a method is suggested, in which halogen such as iodine is brought into contact with an organic compound containing a lead component produced using the Grignard reagent, followed by a washing step such as water washing, to reduce the lead content to about 3 to 10 ppb on a mass basis (see Patent Document 1).

Patent Document 1: Japanese Unexamined Patent Application, Publication No. 2003-128630

DISCLOSURE OF THE INVENTION

Problems to be Solved by the Invention

By the method described in Patent Document 1 above, it is possible to remove lead until the lead content in an organic compound is at a ppb level on a mass basis. In the method in Patent Document 1 above, however, since an organic compound and halogen are brought into contact, a side reaction with halogen can occur depending on the types of organic compound, and the quality thereof can be reduced. Therefore, a method for removing a lead component, which does not cause a side reaction, has been desired. It was further proved by the investigations of the present inventors that it was difficult to obtain higher purity, i.e. to remove lead until the lead content was at a sub-ppb level on a mass basis by the method in Patent Document 1 above.

It was further proved by the investigations of the present inventors that even when the above removal methods such as an ion exchange resin and a chelate resin, the method described in Patent Document 1 above, and other methods were used individually or two or more methods were used in combination as a method for removing a lead component in the above organic compound containing a lead component, particularly in an organic compound produced by the above Grignard reagent, it was difficult to remove lead until the lead content was at a sub-ppb level on a mass basis. Therefore, an object of the present invention is to provide a method for purifying an organic compound, which can industrially and efficiently remove a lead component, which is difficult to remove, in an organic compound.

Means for Solving the Problems

The present inventors diligently investigated to solve the above problems. Firstly, when lead components contained in organic compounds produced by the Grignard reagent were analyzed, it was suggested that the lead components contained in the organic compounds existed as elemental lead, or in the state of an inorganic salt such as lead chloride, and moreover in the state of an organolead compound in which lead is bound to an organic compound. It was further proved that, when organic compounds containing these lead components were subjected to purification treatments such as an ion exchange resin, a chelate resin and activated carbon, elemental lead or an inorganic salt such as lead chloride could be efficiently removed, but an organolead compound was difficult to remove.

The present inventors investigated a method for efficiently removing an organolead compound based on the above knowledge, and consequently found that lead could be efficiently removed until the lead content was at a sub-ppb level on a mass basis by irradiating an organic compound containing a lead component with ultraviolet rays and then using the above purification operation, thereby completing the present invention. That is, the first invention is a method for purifying an organic compound, by which an organic compound having a reduced lead content is obtained from an organic compound containing a lead component as an impurity, the method comprising irradiating the organic compound containing a lead component with ultraviolet rays, and then removing the lead component in the organic compound.

The above first invention can suitably employ the following aspects:

1) the lead component includes an organolead compound,
2) the organic compound is an organosilicon compound,
3) the organic compound containing a lead component is dissolved in an organic solvent, and the organic compound dissolved in the organic solvent is then irradiated with ultraviolet rays,
4) the concentration of the organic compound containing a lead component dissolved in the organic solvent is 0.01 to 1.0 mass,
5) the wavelength of the ultraviolet rays is 210 to 350 nm, 6) the cumulative light intensity of ultraviolet rays with which the organic compound containing a lead component is irradiated is 0.1 to 100 $J/cm^2$, 7) the molar absorption coefficient of the organic solvent at the wavelength of ultraviolet rays with which the organic compound containing a lead component is irradiated is 100 $L \cdot mol^{-1} \cdot cm^{-1}$ or less, 8) the method for removing a lead component is a method in which the organic compound dissolved in the organic solvent after irradiation with the ultraviolet rays is brought into contact with water, and the water layer is then removed, and 9) the method for removing a lead component is a method in which the organic compound dissolved in the organic solvent after irradiation with the ultraviolet rays is brought into contact with an absorbent.

In addition, the second invention is a method for producing an organic compound, including purifying the organic compound by the method for purifying an organic compound described in the above first invention.

Effects of the Invention

By the method for purifying an organic compound of the present invention, the lead content of an organic compound containing a lead component as an impurity can be reduced to a sub-ppb level on a mass basis. The reason why the lead content of an organic compound can be highly reduced by the method for purifying an organic compound of the present invention as described above is unclear in detail; however, the present inventors presume as follows. That is, the lead component contained in the organic compound may exist as elemental lead, or in the state of an inorganic salt such as lead chloride, and moreover in the state of an organic lead compound in which lead is bound to an organic compound, as described above. In organic compounds produced by preparing an organic metal compound, particularly, lead is contained in metal used when preparing an organic metal compound in many cases, and it is presumed that an organic lead compound, in which lead is bound to an organic compound by a reaction, tends to be contained.

It is presumed that the above methods such as an ion exchange resin, a chelate resin and activated carbon can remove elemental lead, which is a relatively smaller molecule and has a smaller molecular size, or an inorganic salt of lead by adsorbing these, while the effect of removing an organic lead compound having a larger molecular size is small. It is presumed that in the method for purifying an organic compound of the present invention, by irradiating an organic compound containing a lead component such as an organic lead compound with ultraviolet rays, the chemical form thereof is changed, for example, the bond of carbon and lead in the organic lead compound is cleaved. It is presumed that after changes in the chemical form, the lead component has been changed into an ionic chemical form in a solvent, and consequently the lead component can be removed by methods such as an ion exchange resin, a chelate resin and activated carbon.

The method for removing a lead component in an organic compound in the method for purifying an organic compound of the present invention is a method in which ultraviolet light irradiation and another removal method are combined, can efficiently reduce the lead content of the organic compound by an industrially easy method, and has very high industrial applicability.

PREFERRED MODE FOR CARRYING OUT THE INVENTION

The embodiment of the present invention will be described.

The method for purifying an organic compound of the present embodiment is characterized by irradiating an organic compound containing a lead component as an impurity with ultraviolet rays and then removing the lead component in the organic compound. The method for purifying an organic compound of the present embodiment will now be described in detail.

(Organic Compound Containing Lead Component)

The organic compound containing a lead component used in the method for purifying an organic compound of the present embodiment is an organic compound containing a lead component as an impurity, and the structure thereof is not particularly restricted. The "containing as an impurity" in the description and claims indicates that the impurity content with respect to an organic compound is 1% or less on a mass basis. Herein, the above organic compound indicates a compound which has a lead component to be removed by the method for purifying an organic compound of the present embodiment. There is also a case where an organic compound is dissolved in an organic solvent as described below, and in this case, the above organic solvent is not included in the organic compound as a standard for the impurity content. As described above, examples of the form of a lead component contained in an organic compound include elemental lead, or the state of an inorganic salt such as lead chloride, and moreover the state of an organic lead compound in which lead is bound to an organic compound. All organic compounds containing any of these forms or a mixture thereof can be suitably used in the method for purifying an organic compound of the present embodiment; however, the organic compound preferably contains an organic lead compound because the effect of removing a lead component by the method for purifying an organic compound of the present embodiment is high.

In addition, from the viewpoint of the removal efficiency of a lead component in an organic compound in the method for purifying an organic compound of the present embodiment, the lead content of the organic compound is preferably 1 ppb to 1000 ppm on a mass basis, more preferably 10 ppb to 100 ppm, and particularly preferably 10 ppb to 1 ppm. When the lead content of an organic compound is beyond the above range, the method for purifying an organic compound of the present embodiment may be used after the lead content is reduced in advance by e.g. the above known methods. The lead content of an organic compound can be analyzed by methods of ICP-OES and ICP-MS.

When a lead component is contained in an organic compound, specific examples of the organic compound include organic compounds produced using organic metal compounds such as an organic magnesium compound (generally known as the Grignard reagent), an organic lithium copper compound, an organic zinc compound, an organic rare-earth compound and an organic lead compound. Particularly when an organic metal compound is produced using elemental metal and used to produce an organic compound, a lead component tends to be contained as an impurity in elemental metal. The method for purifying an organic compound of the present embodiment can be suitably used also for the above organic compound which is produced after an organic metal compound is produced.

In addition, an organosilicon compound having a carbon-silicon bond can be also used as an organic compound used in the method for purifying an organic compound of the present embodiment. A carbosilane compound, a type of organosilicon compound, and so on, can be synthesized using the Grignard reagent, but a lead component is easily mixed therein as a metal impurity in production processes as described above. Therefore, the method for purifying an organic compound of the present embodiment can be suitably used.

(Ultraviolet Rays)

In the method for purifying an organic compound of the present embodiment, the above organic compound containing a lead component is irradiated with ultraviolet rays. It is presumed that by ultraviolet light irradiation, the chemical form is changed, for example, the bond of carbon and lead in an organic lead compound is cleaved. Therefore, the wavelength of ultraviolet rays with which an organic compound containing a lead component is irradiated may be properly determined considering the binding energy of lead and carbon in an organic lead compound. The wavelength of ultraviolet rays is preferably 210 to 350 nm.

Because a lead component can be efficiently removed, specifically, the wavelength of ultraviolet rays with which an organic compound containing a lead component is irradiated is preferably 210 to 350 nm, more preferably 220 to 320 nm, and particularly preferably 240 to 300 nm. In the case of a wavelength of 350 nm or more, the reaction does not easily occur because of not having absorption derived from an organic lead compound, and the effect of removing a lead component tends to be reduced. Meanwhile, in the case of a wavelength of shorter than 210 nm, a side reaction due to absorption of an organic compound tends to easily occur.

In addition, the amount of ultraviolet light irradiation in the method for purifying an organic compound of the present embodiment is provided by the cumulative light intensity. The cumulative light intensity may be properly adjusted depending on the lead content of an organic compound, and is preferably 0.1 $J/cm^2$ to 100 $J/cm^2$, more preferably 1 $J/cm^2$ to 80 $J/cm^2$, and particularly preferably 10 $J/cm^2$ to 60 $J/cm^2$.

The cumulative light intensity can be found by a product of the intensity and irradiation time of ultraviolet rays. Therefore, the intensity and irradiation time of ultraviolet light irradiation may be properly set so that the cumulative light intensity will be within the above range.

The device for ultraviolet light irradiation is not particularly restricted as long as it is a light source to emit ultraviolet rays, and e.g. an ultraviolet fluorescent lamp, a mercury lamp, a heavy hydrogen lamp, an ultraviolet LED and an ultraviolet laser can be used.

In addition, as a method for ultraviolet light irradiation, the above organic compound containing a lead component in a solid state may be directly irradiated, or the organic compound after being dissolved in an organic solvent may be irradiated with ultraviolet rays. Because the organic compound can be efficiently irradiated with ultraviolet rays and a lead component after ultraviolet light irradiation can be efficiently removed, ultraviolet light irradiation after the above organic compound is dissolved in an organic solvent is preferred. When the above organic compound after being dissolved in an organic solvent is irradiated with ultraviolet rays, it is preferred that an organic compound solution be added to a quartz container with high transparency to ultraviolet rays, and it be irradiated with ultraviolet rays.

(Organic Solvent)

The organic solvent to dissolve the above organic compound containing a lead component is not particularly restricted as long as it can dissolve a target organic compound, and an organic solvent with high transparency to ultraviolet rays, i.e. an organic solvent which does not absorb the wavelength of ultraviolet rays is preferably used because the effect by ultraviolet light irradiation is high. Specifically, the molar absorption coefficient $\varepsilon$ at the wavelength of ultraviolet light irradiation is preferably 100 $L \cdot mol^{-1} \cdot cm^{-1}$ or less, more preferably 50 $L \cdot mol^{-1} \cdot cm^{-1}$ or less, and particularly preferably 10 $L \cdot mol^{-1} \cdot cm^{-1}$ or less. A smaller molar absorption coefficient $\varepsilon$ is preferred. The lower limit is preferably 0, and a molar absorption coefficient $\varepsilon$ of 0.001 $L \cdot mol^{-1} \cdot cm^{-1}$ is sufficient. Specific examples of such organic solvent include, as solvents with high transparency to ultraviolet rays at a wavelength of 210 nm or more and 220 nm or less, aliphatic hydrocarbon solvents such as pentane, hexane and heptane; nitrile solvents such as acetonitrile and propionitrile; aliphatic lower alcohol solvents such as methanol, ethanol and propanol, and the like. Examples of solvents with high transparency to ultraviolet rays at a wavelength of 220 nm or more and 250 nm or less include ether solvents such as diethyl ether, tetrahydrofuran, dioxane and diisopropyl ether; chlorine solvents such as chloroform and dichloromethane, and the like. Examples of solvents with high transparency to ultraviolet rays at a wavelength of 250 nm or more and 310 nm or less include aromatic solvents such as benzene and toluene; ester solvents such as ethyl acetate and propyl acetate, and the like.

The concentration of an organic compound containing a lead component dissolved in an organic solvent is preferably 0.01 to 10 mass %, and more preferably 0.01 to 1.0 mass from the viewpoint of the effect of ultraviolet light irradiation and the handleability of post-treatment.

The temperature when irradiating an organic compound containing a lead component dissolved in an organic solvent with ultraviolet rays is not particularly restricted, and may be properly set to a temperature at which the organic compound and the organic solvent are stable, and may be properly set commonly at 0 to 30° C.

(Additives)

When ultraviolet light irradiation is carried out after an organic compound containing a lead component is dissolved in an organic solvent, other components may be added to increase the effect by ultraviolet light irradiation. Specific examples of other components added include photosensitizers such as benzophenone, anthracene and camphorquinone, and the like. In addition, when the organic compound has a polymerizable group such as a (meth)acryl group, a vinyl group or an epoxy group, a polymerization inhibitor such as dibutylhydroxytoluene or benzoquinone may be added. The amount of these additives added may be properly determined considering a desired effect, and a photosensitizer may be used in an amount of 0.01 to 1 part by mass per 1 part by mass of the organic compound containing a lead component, and a polymerization inhibitor may be used in an amount of 0.01 to 1 part by mass per 1 part by mass of the organic compound containing a lead component.

(Method for Removing Lead Component)

In the method for purifying an organic compound of the present embodiment, after irradiating an organic compound containing a lead component with ultraviolet rays, the lead component is removed. The method for removing a lead component is not particularly restricted, and a known removal method can be used. Specific examples of the removal method include water or acid washing, filtration, a method in which the organic compound is brought into contact with an adsorbent such as an ion exchange resin, a chelate resin or activated carbon, and the like. These removal methods can sufficiently remove a lead component by one operation; however, these operations may be combined depending on a desired lead content. The method for removing a lead component after ultraviolet light irradiation will now be described.

(Water Washing)

When an organic solvent which is separate from water, such as a hydrocarbon solvent, an ether solvent or a chlorine solvent, is selected as an organic solvent which dissolves an organic compound containing a lead component, the lead component in the organic compound can be removed by bringing a solution containing the organic compound after ultraviolet light irradiation into contact with water, and then removing the water layer. At this time, a dilute acid such as nitric acid or hydrochloric acid may be used to increase the solubility of the lead component in water. When a dilute acid is used, the concentration of acid may be 0.001 to 1 mol/L.

The temperature when the organic compound containing a lead component dissolved in the above organic compound is brought into contact with water is not particularly restricted, and may be properly set to a temperature at which the organic compound and the organic solvent are stable, and may be properly set to commonly 0 to 30° C.

(Filtration)

When a lead component is precipitated as an inorganic salt, the lead component can be removed outside the system by a filtration operation. It is possible to obtain an organic compound solution having reduced lead components by filtering a solution containing the organic compound after ultraviolet light irradiation using a filter or filter paper, and collecting the filtrate.

(Treatment Using Adsorbent)

A lead component in an organic compound can be adsorbed to an adsorbent and removed by bringing a solution containing the organic compound after ultraviolet light irradiation into contact with the adsorbent. As the adsorbent to remove a lead component, activated carbon, an ion exchange resin, a chelate resin and a synthetic adsorbent, which are used in known metal treatments, can be used. The activated carbon can be used in any form of e.g. granular, powder and fiber forms. The raw material thereof may be derived from a natural product such as coconut shell and derived from a synthetic resin, and heating and drying under reduced pressure at 150 to 250° C. are preferably carried out as a pretreatment. Both batch treatment and column treatment can be applied in the treatment of an organic compound solution containing a lead component by activated carbon. In the batch treatment, specifically, an organic compound solution having reduced lead components can be obtained by adding 1 to 15 mass % activated carbon to an organic compound solution after ultraviolet light irradiation, stirring and shaking the obtained mixture at a solution temperature of 0 to 30° C. for 0.5 to 48 hours, and then removing the activated carbon by filtration. In the column treatment, specifically, an organic compound solution having reduced lead components can be obtained by filling activated carbon with an organic solvent which has solved an organic compound in a cylindrical container of e.g. PTFE, PFA or glass, and then applying an organic compound solution after ultraviolet light irradiation thereto at a space velocity of 1 to 50 $h^{-1}$ at a solution temperature of 0 to 30° C.

As the ion exchange resin, a cation exchange resin can be used, and any cation exchange resin of strong acid, weak acid, gel type and porous type may be used. As the chelate resin, a chelate resin which is used for known metal treatments can be used, and specific examples thereof include iminodiacetic acid type, nitrilotriacetic acid type, ethylenediaminetetraacetic acid type, diethylenetriaminepentaacetic acid type and triethylenetetramine hexaacetic acid type resins, and the like. As the synthetic adsorbent, polystyrene type and polymethacrylic acid type adsorbents may be used, and specific examples thereof include a styrene-divinylbenzene copolymer, an ethylstyrene-divinylbenzene copolymer, a methyl methacrylate-ethylene glycol dimethacrylate copolymer and the like. Those obtained by substitution with halogen such as bromine on the benzene ring of styrene may be also used. As the pretreatment of an ion exchange resin, a chelate resin or a synthetic adsorbent, it is suitable that a solvent in a resin is replaced with an organic solvent to dissolve an organic compound in the final step after a treatment by a known method. Both batch treatment and column treatment can be applied in the treatment of an organic compound solution containing a lead component by an ion exchange resin, a chelate resin or a synthetic adsorbent, and specifically an organic compound solution having reduced lead components can be obtained by the same operation as the above treatment using activated carbon.

(Subsequent Treatment)

By the above method for purifying an organic compound of the present embodiment, the lead content of an organic compound containing a lead component can be greatly reduced, and can be also reduced to a sub-ppb level on a mass basis. Therefore, an organic compound produced using the method for purifying an organic compound of the present embodiment has high purity, and can be used for applications such as electronic materials and active pharmaceutical ingredients. When the chemical purity of an organic compound is improved, purity can be also improved by a known purification operation such as recrystallization or column chromatography. When an organic compound containing a lead component is a carbosilane compound, a polycarbosilane compound in which the lead content is highly reduced can be produced by removing the lead component using the method for purifying an organic compound of the present embodiment, and then polycondensation by a known method.

The embodiment of the present invention has been described. However, the present invention is not limited to the above embodiment, and the above embodiment can be properly modified within the scope of spirit of the present invention.

EXAMPLES

The present invention will now be described in more detail by way of examples thereof. It should be noted, however, that the present invention is not restricted to these examples in any way.

Synthesis Example 1

In 60 mL of tetrahydrofuran, 18.1 g (65 mmol) of lead chloride was dispersed, the inside of the system was replaced by blowing nitrogen, and the obtained mixture was cooled to 5° C. A 3 mmol/L solution of methylmagnesium chloride in tetrahydrofuran, 72 mL (215 mmol), was added dropwise thereto with a dropping funnel. Next, a solution obtained by dissolving 8.0 g (65 mmol) of (chloromethyl)trimethylsilane in 60 mL of tetrahydrofuran was added dropwise thereto, and the obtained mixture was heated to room temperature after completion of dropwise addition and then stirred for 25 minutes. By adding 100 ml of water, the remaining methylmagnesium chloride was allowed to react, and tetrahydrofuran was then distilled off under reduced pressure. The organic phase separated on the bottom was collected and washed with water to obtain 15 g of a crude product of (trimethylplumbyl)(trimethylsilyl)methane. Purification was carried out by column chromatography using silica gel as a filler to obtain 13 g of (trimethylplumbyl)(trimethylsilyl)methane (38 mmol, yield 58%, gas chromatography purity 99%).

Example 1

(Trimethylplumbyl)(trimethylsilyl)methane obtained in Synthesis Example 1 was dissolved in acetonitrile to prepare a 1.0 mass % acetonitrile solution. Into a quartz test tube (φ12×90 mm, capacity 5 mL), 3 mL of the solution was added, and it was irradiated with ultraviolet rays for 4 hours using a 254 nm ultraviolet lamp (Handy UV Lamp SLUV-8 manufactured by AS ONE CORPORATION). The cumulative light intensity at this time was 43 J/cm². After irradiation, filtration was carried out using a 0.45 μm PTFE filter to remove a lead component. The lead removal rate calculated by measuring the obtained filtrate by GC/MS was 28%.

It should be noted that the lead removal rate was measured by GC/MS (7890B-5977B manufactured by Agilent Technologies) in Examples 1 to 6. In gas chromatography, a dimethylpolysiloxane column was used as the column and helium was used as the carrier gas. The inlet temperature was 280° C. and the oven temperature was raised from 40° C. to 340° C. to carry out the measurement. The injection amount was 1 μL. The peak area value of (trimethylplumbyl)(trimethylsilyl)methane was found on the obtained chromatogram, and the lead removal rate was found as follows:

Lead removal rate (%)=100×{1−(peak area value after treatment)/(peak area value before ultraviolet light irradiation)}.

Example 2

The same operation as in Example 1 was carried out except that hexane was used in place of acetonitrile. The resultant removal rate was 22%.

Example 3

The same operation as in Example 1 was carried out except that the concentration of (trimethylplumbyl)(trimethylsilyl)methane was changed to 0.1 mass %. The resultant removal rate was 98%.

Example 4

The same operation as in Example 1 was carried out except that the concentration of (trimethylplumbyl)(trimethylsilyl)methane was changed to 0.01 mass %. The resultant removal rate was 100%.

Example 5

The same operation as in Example 1 was carried out except that the wavelength of the lamp was changed to 312 nm. The resultant removal rate was 48%.

Example 6

The same operation as in Example 1 was carried out except that the wavelength of the lamp was changed to 365 nm. The resultant removal rate was 3%.

The results of Examples 1 to 6 above were shown in Table 1.

TABLE 1

| | Organic solvent (wt %) | UV wave length (nm) | Cumulative light intensity (J/cm²) | Post-treatment | Lead removal rate % |
|---|---|---|---|---|---|
| Example 1 | Acetonitrile (1.0) | 254 | 43 | Filtration | 28 |
| Example 2 | Hexane (1.0) | 254 | 43 | Filtration | 22 |
| Example 3 | Acetonitrile (0.1) | 254 | 43 | Filtration | 98 |
| Example 4 | Acetonitrile (0.01) | 254 | 43 | Filtration | 100 |
| Example 5 | Acetonitrile (1.0) | 312 | 43 | Filtration | 48 |
| Example 6 | Acetonitrile (1.0) | 365 | 58 | Filtration | 3 |

Synthesis Example 2

In 40 mL of diethyl ether, 3.65 g (150 mmol) of magnesium was dispersed, and the inside of the system was replaced by blowing nitrogen. To the obtained mixture, 35 mL of a solution of 20.6 g (150 mmol) of n-butyl bromide in diethyl ether was slowly added dropwise to prepare an n-butylmagnesium bromide solution. Under an ice bath, 10 mL of a solution of 5.55 g (75 mmol) of ethyl formate in diethyl ether was slowly added dropwise thereto, and the ice bath was removed after completion of dropwise addition, and the reaction was carried out for another 10 minutes. After adding 10 mL of water thereto at a velocity at which reflux occurs, 40 mL of cooled dilute sulfuric acid (0.2%) was added. The ether phase was collected. After ether was distilled off under normal pressure, 7.5 mL of a 15% potassium hydroxide aqueous solution was added thereto, and heating reflux was carried out for 3 hours. The organic phase was collected and dried with anhydrous potassium carbonate, and the drying agent was then filtered out. Ether was distilled off to obtain 9.0 g of 5-nonanol (62 mmol, yield 83%, gas chromatography purity 98%). When the lead content was analyzed, the content was 48 ppb.

It should be noted that the removal rate of lead in an organic compound was measured using ICP-MS by the following method in the following examples.
(Method for Measuring Lead Removal Rate)

Into a container made of Teflon (registered trademark), 1 mL of an organic solvent solution in which an organic compound had been dissolved was added, and it was heated on a hot plate to volatilize the organic solvent. To the obtained substance, 1 mL of ultrapure water, 3 mL of nitric acid (60%) and 2 mL of hydrofluoric acid (50%) were added dropwise, and the obtained mixture was heated. After wet decomposition, heating was further continued to dryness. Wet decomposition and drying were repeated until the organic compound was completely decomposed. Subsequently the remaining lead components were collected with 0.2 mL of nitric acid (60%), and the obtained solution was then diluted in a measuring container to 20 mL, and this was used as a measurement solution. The concentration of lead in the measurement solution was determined by ICP-MS (ICP-MS7900 manufactured by Agilent Technologies), and the lead removal rate was found as follows:

Lead removal rate (%)=100×{1−(lead concentration after treatment)/(lead concentration before ultraviolet light irradiation)}.

Example 7

5-Nonanol obtained in Synthesis Example 2 was dissolved in hexane to prepare a 1.0 mass % hexane solution.

Into a quartz test tube ((12×90 mm, capacity 5 mL), 3 mL of the solution was added, and it was irradiated with ultraviolet rays for 2 hours using a 254 nm ultraviolet lamp (Handy UV Lamp SLUV-8 manufactured by AS ONE CORPORATION). At this time, the ultraviolet light intensity was 3 mW/cm$^2$, and the cumulative light intensity was 22 J/cm$^2$. After irradiation, 3 mL of water was added thereto, the obtained mixture was stirred well, and the water washing operation to remove the water phase was then carried out. The water washing operation was carried out three times in total, and the lead content was then analyzed by the method described above. The lead content was 12 ppb and the calculated lead removal rate was 75%.

Comparative Example 1

After preparing the same solution as in Example 7, ultraviolet light irradiation was not carried out, and the water washing operation only was carried out. The resultant removal rate was 0%.

Comparative Example 2

After ultraviolet light irradiation in the same operation as in Example 7, the water washing operation was not carried out. The resultant removal rate was 1%.

Example 8

The same operation as in Example 7 was carried out except that the cumulative light intensity was changed to 11 J/cm$^2$. The resultant lead content was 22 ppb and the resultant lead removal rate was 54%.

Example 9

The same operation as in Example 7 was carried out except that the cumulative light intensity was changed to 2 J/cm$^2$. The resultant lead content was 44 ppb and the resultant lead removal rate was 8%.

Example 10

The same operation as in Example 7 was carried out except that the concentration of 5-nonanol was changed to 0.1 mass. The resultant lead content was 2 ppb and the resultant lead removal rate was 95%.

Example 11

The same operation as in Example 7 was carried out except that the concentration of 5-nonanol was changed to 0.01 mass %. The resultant lead content was 0.9 ppb and the resultant lead removal rate was 98%.

Example 12

The same operation as in Example 7 was carried out except that the organic solvent for dissolution was changed to chloroform. The resultant lead content was 8 ppb and the resultant lead removal rate was 84%.

Example 13

The same operation as in Example 7 was carried out except that the wavelength of the ultraviolet lamp was changed to 312 nm. The resultant content was 30 ppb and the resultant removal rate was 38%.

Example 14

The same operation as in Example 7 was carried out except that the wavelength of the ultraviolet lamp was changed to 365 nm. The resultant content was 46 ppb and the resultant removal rate was 4%.

Example 15

5-Nonanol obtained in Synthesis Example 2 was dissolved in diisopropyl ether (DIPE) to prepare a 1.0 mass % diisopropyl ether solution. Into a quartz test tube (φ22×200 mm, capacity 50 mL), 30 mL of the solution was added, and it was irradiated with ultraviolet rays for 2 hours using a 254 nm ultraviolet lamp (Handy UV Lamp SLUV-8 manufactured by AS ONE CORPORATION). At this time, the ultraviolet light intensity was 3 mW/cm$^2$ and the cumulative light intensity was 22 J/cm$^2$. The solution after irradiation was applied to a column packed with 500 mg of an iminodiacetic acid type chelate resin. When the lead content of the obtained solution was analyzed by the method described above, the lead content was 0.9 ppb and the lead removal rate was 98%.

Example 16

To a solution after ultraviolet light irradiation in the same operation as in Example 15, 5 mass % SHIRASAGI WG-H (Osaka Gas Chemicals Co., Ltd.), granular activated carbon, was added, and the obtained mixture was shaken for 24 hours, and the activated carbon was then removed by filtration. When the lead content of the obtained solution was analyzed by the method described above, the lead content was 4 ppb and the lead removal rate was 91%.

Comparative Example 3

After preparing the same solution as in Example 15, ultraviolet light irradiation was not carried out, and the treatment operation using a chelate resin only was carried out. The resultant removal rate was 0%.

Comparative Example 4

After preparing the same solution as in Example 15, ultraviolet light irradiation was not carried out, and the treatment operation using activated carbon only was carried out. The resultant removal rate was 1%.

The results of Examples 7 to 16 and Comparative Examples 1 to 4 above were shown in Table 2.

TABLE 2

|  | Organic solvent (wt %) | UV wave length (nm) | Cumulative light intensity (J/cm$^2$) | Post-treatment | Lead content (ppb) | Lead removal rate (%) |
| --- | --- | --- | --- | --- | --- | --- |
| Synthesis Example 2 | — | — | — | — | 48 | — |
| Example 7 | Hexane (1.0) | 254 | 22 | Water washing | 12 | 75 |
| Comparative Example 1 | Hexane (1.0) | — | 0 | Water washing | 48 | 0 |

TABLE 2-continued

|  | Organic solvent (wt %) | UV wave length (nm) | Cumulative light intensity (J/cm²) | Post-treatment | Lead content (ppb) | Lead removal rate (%) |
|---|---|---|---|---|---|---|
| Comparative Example 2 | Hexane (1.0) | 254 | 22 | None | 48 | 1 |
| Example 8 | Hexane (1.0) | 254 | 11 | Water washing | 22 | 54 |
| Example 9 | Hexane (1.0) | 254 | 2 | Water washing | 44 | 8 |
| Example 10 | Hexane (0.1) | 254 | 22 | Water washing | 2 | 95 |
| Example 11 | Hexane (0.01) | 254 | 22 | Water washing | 0.9 | 98 |
| Example 12 | Chloroform (1.0) | 254 | 22 | Water washing | 8 | 84 |
| Example 13 | Hexane (1.0) | 312 | 22 | Water washing | 30 | 38 |
| Example 14 | Hexane (1.0) | 365 | 29 | Water washing | 46 | 4 |
| Example 15 | DIPE (1.0) | 254 | 22 | Chelate | 0.9 | 98 |
| Example 16 | DIPE (1.0) | 254 | 22 | Activated carbon | 4 | 91 |
| Comparative Example 3 | DIPE (1.0) | — | 0 | Chelate | 48 | 0 |
| Comparative Example 4 | DIPE (1.0) | — | 0 | Activated carbon | 48 | 1 |

Synthesis Example 3

In 30 mL of tetrahydrofuran, 1.3 g (55 mmol) of magnesium was dispersed, and the inside of the system was replaced by blowing nitrogen. 20 mL of a solution of 6.8 g (55 mmol) of (chloromethyl)tr imethylsilane in tetrahydrofuran was slowly added dropwise thereto to prepare a (trimethylsilyl)methylmagnesium chloride solution. Under an ice bath, 5.4 g (50 mmol) of trimethylsilyl chloride was slowly added dropwise thereto, and the ice bath was removed after completion of dropwise addition, and the reaction was carried out at room temperature for another 4 hours. After adding 40 mL of a 5% ammonium chloride aqueous solution thereto, the obtained mixture was stirred at room temperature for 30 minutes. The organic phase was collected, and the remaining water phase was extracted with 50 mL diethyl ether three times, and the obtained phases were combined with the organic phase collected previously. The organic phase was washed with 20 mL of water three times and 20 mL of saturated salt water once, and dried with anhydrous magnesium sulfate, and the drying agent was then filtered out. The solvent was distilled off to obtain 4.3 g of bis(trimethylsilyl)methane (27 mmol, yield 53%, gas chromatography purity 97%). When the lead content was analyzed, the content was 30 ppb.

Example 17

Bis(trimethylsilyl)methane obtained in Synthesis Example 3 was dissolved in hexane to prepare a 1.0 mass % hexane solution. Into a quartz test tube (12×90 mm, capacity 5 mL), 3 mL of the solution was added, and it was irradiated with ultraviolet rays for 2 hours using a 254 nm ultraviolet lamp (Handy UV Lamp SLUV-8 manufactured by AS ONE CORPORATION). At this time, the ultraviolet light intensity was 3 mW/cm² and the cumulative light intensity was 22 J/cm². After irradiation, 3 mL of water was added thereto, and the obtained mixture was stirred well, and the water washing operation to remove the water phase was carried out. The water washing operation was carried out three times in total, and the lead content was then analyzed by the method described above. The lead content was 7 ppb and the calculated lead removal rate was 78%.

Comparative Example 5

After preparing the same solution as in Example 17, ultraviolet light irradiation was not carried out, and the water washing operation only was carried out. The resultant removal rate was 0%.

Comparative Example 6

After ultraviolet light irradiation in the same operation as in Example 17, the water washing operation was not carried out. The resultant removal rate was 1%.

Example 18

Bis(trimethylsilyl)methane obtained in Synthesis Example 3 was dissolved in diisopropyl ether (DIPE) to prepare a 1.0 mass % diisopropyl ether solution. Into a quartz test tube (φ22×200 mm, capacity 50 mL), 30 mL of the solution was added, and it was irradiated with ultraviolet rays for 2 hours using a 254 nm ultraviolet lamp (Handy UV Lamp SLUV-8 manufactured by AS ONE CORPORATION). At this time, the ultraviolet light intensity was 3 mW/cm² and the cumulative light intensity was 22 J/cm². The solution after irradiation was applied to a column packed with 500 mg of an iminodiacetic acid type chelate resin. When the lead content of the obtained solution was analyzed by the method described above, the lead content was 0.3 ppb and the lead removal rate was 99%.

Comparative Example 7

After preparing the same solution as in Example 18, ultraviolet light irradiation was not carried out, and the treatment operation using a chelate resin only was carried out. The resultant removal rate was 0%.

The results of Examples 17 and 18 and Comparative Examples 5 to 7 above were shown in Table 3.

TABLE 3

| | Organic solvent (wt %) | UV wave length (nm) | Cumulative light intensity (J/cm$^2$) | Post-treatment | Lead content (ppb) | Lead removal rate (%) |
|---|---|---|---|---|---|---|
| Synthesis Example 3 | — | — | — | — | 30 | — |
| Example 17 | Hexane (1.0) | 254 | 22 | Water washing | 7 | 78 |
| Comparative Example 5 | Hexane (1.0) | | 0 | Water washing | 30 | 0 |
| Comparative Example 6 | Hexane (1.0) | 254 | 22 | None | 30 | 1 |
| Example 18 | DIPE (1.0) | 254 | 22 | Chelate | 0.3 | 99 |
| Comparative Example 7 | DIPE (1.0) | — | 0 | Chelate | 30 | 0 |

The invention claimed is:

1. A method for purifying an organic compound, comprising an organic lead component as an impurity,
the method comprising dissolving the organic compound comprising the organic lead component in an organic solvent to form a solution;
wherein the organic lead component comprises a lead-carbon bond, and
wherein a concentration of the organic lead component in the organic compound before dissolving the organic compound in the organic solvent is within the range of 1 ppb to 1000 ppm on a mass basis; and
irradiating the solution with ultraviolet rays thereby cleaving the lead-carbon bond of the organic lead component and thereby forming a second lead component, and
removing the second lead component from the solution irradiated with ultraviolet rays.

2. The method for purifying an organic compound according to claim 1, wherein the organic compound is an organosilicon compound.

3. The method for purifying an organic compound according to claim 1, wherein the solution before being irradiated with the ultraviolet rays has a concentration of the organic compound of 0.01 to 1.0 mass %.

4. The method for purifying an organic compound according to claim 1, wherein a wavelength of the ultraviolet rays is 210 to 350 nm.

5. The method for purifying an organic compound according to claim 1, wherein a cumulative light intensity of ultraviolet rays with which solution is irradiated is 0.1 to 100 J/cm$^2$.

6. The method for purifying an organic compound according to claim 1, wherein a molar absorption coefficient of the organic solvent at a wavelength of ultraviolet rays with which the solution is irradiated is 100 L·mol$^{-1}$·cm$^{-1}$ or less.

7. The method for purifying an organic compound according to claim 1, wherein the method for removing a lead component is a method in which the organic compound dissolved in the organic solvent after ultraviolet light irradiation is brought into contact with water, and a water layer is then removed.

8. The method for purifying an organic compound according to claim 1, wherein the method for removing a lead component is a method in which the organic compound dissolved in the organic solvent after the ultraviolet light irradiation is brought into contact with an adsorbent.

9. A method for producing an organic compound, comprising:
synthesizing an organic compound with an organometallic compound, and
purifying the synthesized organic compound by the method for purifying an organic compound according to claim 1.

* * * * *